Jan. 5, 1965   M. A. GIANTURCO ET AL   3,164,474
METHOD OF MAKING COFFEE EXTRACT
Filed March 3, 1961   3 Sheets-Sheet 1

INVENTORS
MAURIZIO A. GIANTURCO,
JOHN M. MILLER
BY
Wolfe, Hubbard, Voit & Osann
ATTYS.

Jan. 5, 1965   M. A. GIANTURCO ETAL   3,164,474
METHOD OF MAKING COFFEE EXTRACT
Filed March 3, 1961   3 Sheets-Sheet 2
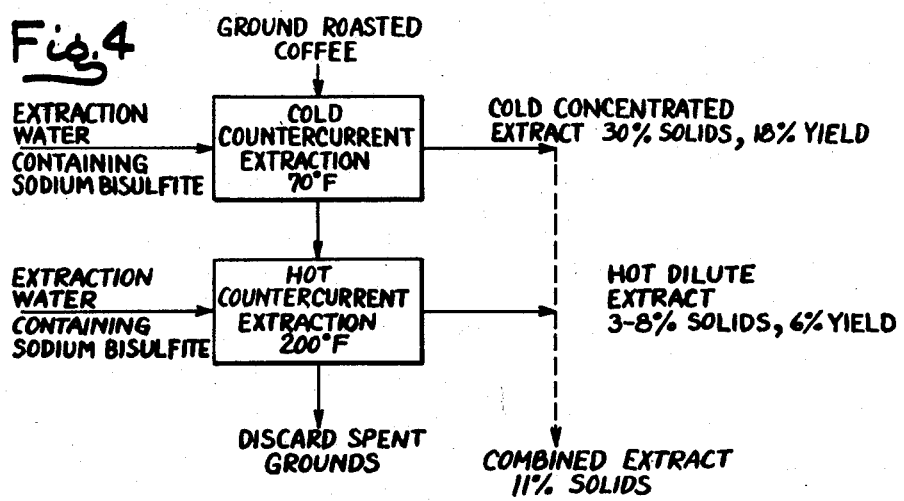
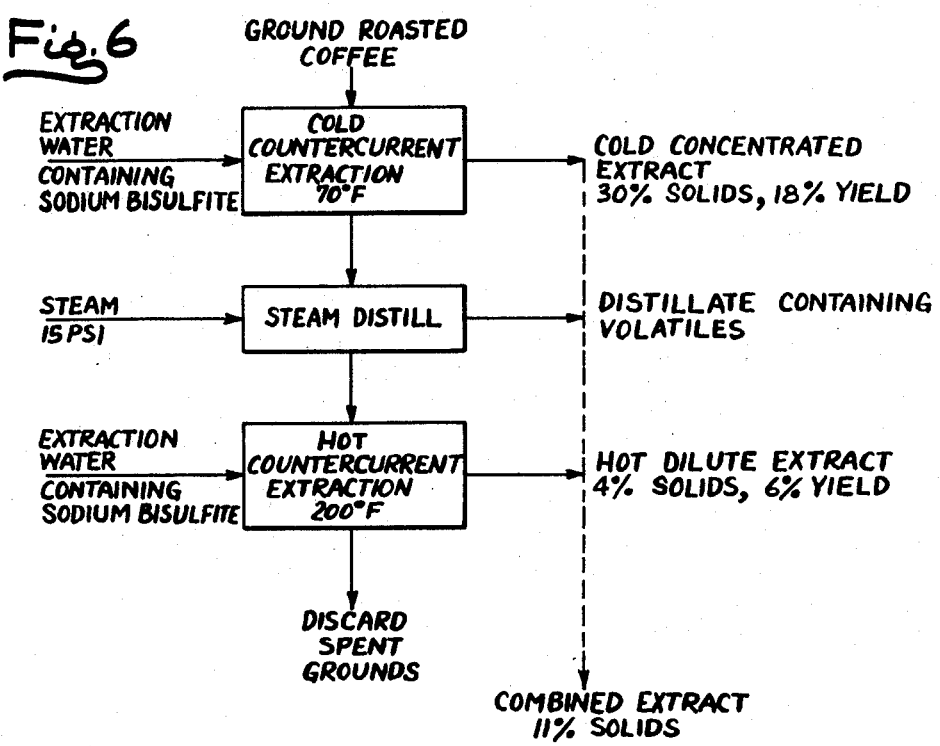
INVENTORS
MAURIZIO A. GIANTURCO
JOHN M. MILLER
BY
Wolfe, Hubbard, Voit+Osann
ATTYS.

Jan. 5, 1965   M. A. GIANTURCO ETAL   3,164,474
METHOD OF MAKING COFFEE EXTRACT
Filed March 3, 1961   3 Sheets-Sheet 3
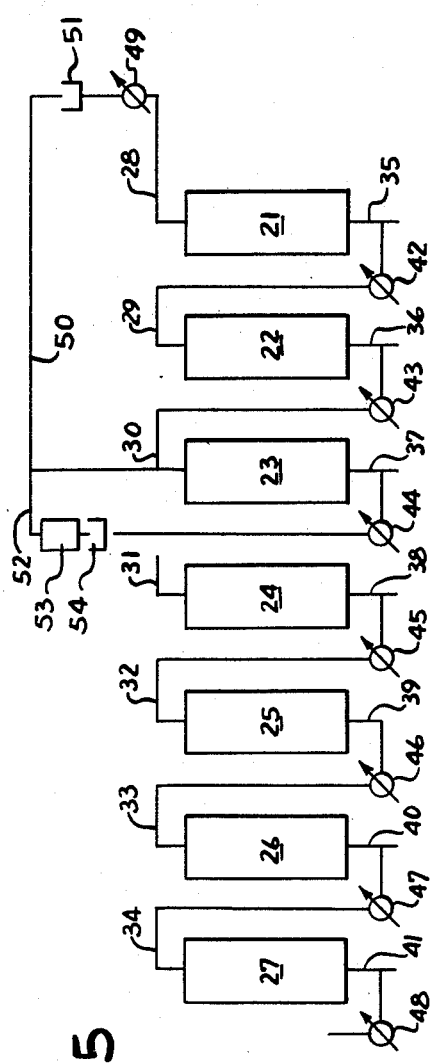
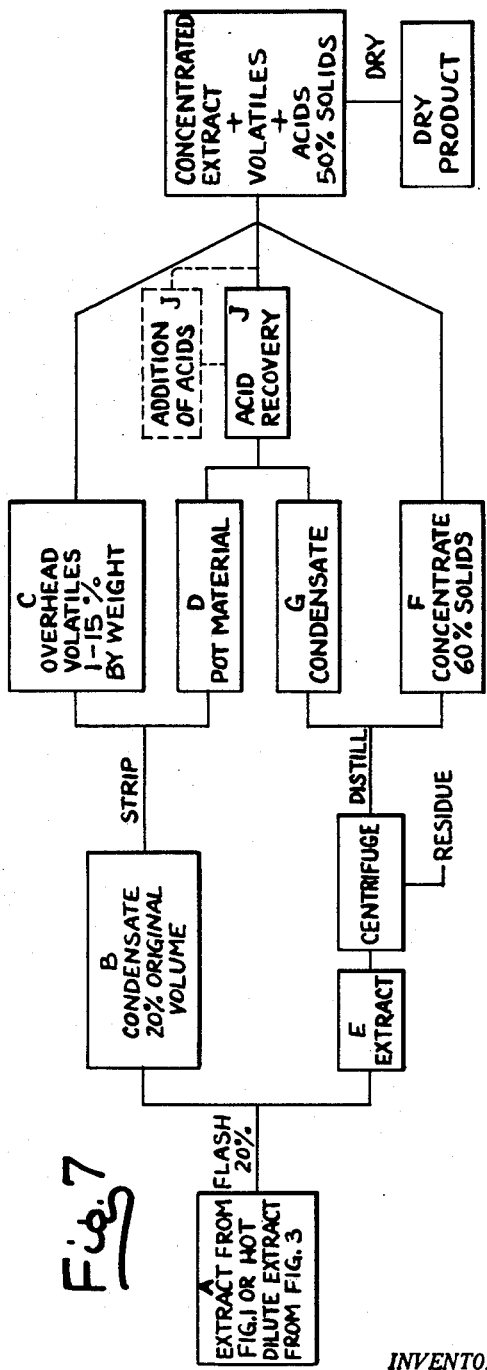
INVENTORS
MAURIZIO A. GIANTURCO
JOHN M. MILLER
BY
Wolfe, Hubbard, Voit & Osann
ATTYS.

United States Patent Office 3,164,474
Patented Jan. 5, 1965

3,164,474
METHOD OF MAKING COFFEE EXTRACT
Maurizio A. Gianturco, Atlantic Highlands, and John M. Miller, Mountainside, N.J., assignors to Tenco, a Division of The Coca Cola Company, Linden, N.J., a corporation of Delaware
Filed Mar. 3, 1961, Ser. No. 93,158
23 Claims. (Cl. 99—71)

The present invention relates to coffee extracts and method of making the same and more particularly to dried granular coffee extracts, known in the trade as instant coffees, and to the products produced by extracting ground, roasted coffee and drying the extract.

In the manufacture of products derived from coffee, and notably dried extracts or instant coffees, the primary goal of the manufacturers has been to produce a final article having the flavor and aroma characteristics which can be obtained by brewing freshly roasted and ground coffee by one of the accepted brewing procedures. While beverages currently obtainable from concentrated liquid extracts or dried powder instant coffees afford a pleasant drink and are acceptable to consumers in general, such products depart to a greater or lesser degree from fresh brew flavor and aroma attainable by brewing the freshly roasted and ground coffee.

It is accordingly the principal object of the present invention to produce a dried extract of coffee which, when dissolved in water at beverage strength, affords a coffee beverage which is substantially indistinguishable from a fresh brew of such coffee.

A related object is to provide a method of producing dried coffee extracts which yields an improved product of the foregoing character.

Another object of the invention is to provide an improved method for producing a concentrated extract of coffee which, upon dilution to beverage strength, affords a drink substantially indistinguishable from a fresh brew of such coffee.

A further object of the invention is to provide an improved method of drying a concentrated coffee extract without affecting the aroma and flavor characteristics thereof.

A more detailed object is to provide an improved method for extracting the flavor, aroma and solid ingredients from ground roasted coffee without deleteriously affecting these constituents so that the extracted ingredients, upon dilution to beverage strength, yield a fresh-brew-like beverage.

Still another object of the invention is to provide an improved method for securing a high concentration of the coffee ingredients in a liquid coffee extract without deleteriously affecting or degrading the important flavor and aroma principles of the product.

Still further objects are to control the development of undesirable flavors and to prevent the deterioration of the extracted constituents during the extraction and drying processes with the consequent development of off tastes in the beverage produced from the extract.

Still another object of the invention is to produce, by a commercially feasible and economically sound process, a substantially improved instant coffee or coffee extract having the foregoing desirable characteristics. A related object of the invention is to provide an improved method for producing instant coffees of the above character which can be carried out in existing equipment.

Other objects and advantages will become apparent from the following description, taken in connection with the accompanying drawings wherein:

FIG. 4 is a diagrammatic representation of a modified form of the present invention.

FIG. 5 is a schematic representation illustrating a modified form of a counter-current extraction apparatus including steam distillation equipment.

FIG. 6 is a diagrammatic representation of a modified form of the invention similar to FIG. 4 but including steam distillation.

FIG. 7 is a diagrammatic representation of a process according to the present invention for producing a dried coffee product.

Figure 1:
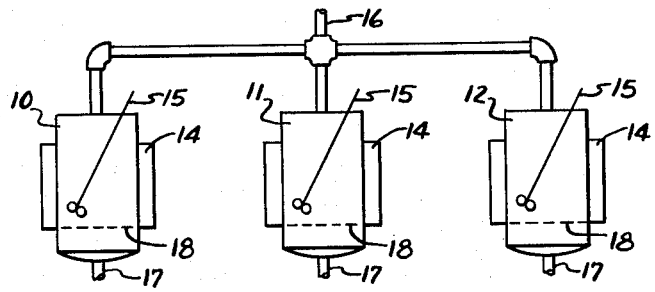
FIGURE 1 is a schematic illustration of an illustrative apparatus carrying out the process of the invention.

While certain illustrative products and processes have been described, it should be understood that there is no intention to limit the invention to the specific forms disclosed. On the contrary, the intention is to cover all modifications, alternatives, equivalents and uses falling within the spirit and scope of the invention as expressed in the appended claims.

There have been many suggestions and methods by which attempts have been made to attain the essentials of fresh brew flavor in a more concentrated form than can be achieved by ordinary brewing. One well known method in the art, which is the subject of numerous patents, employs various non-aqueous solvents for the purpose of extracting the volatile flavor and aroma ingredients from the coffee bean prior to the conventional water extraction. After removing the volatiles from their fatty matrix, these ingredients are added back to a concentrated or dried extract which is produced from a water extraction of the remaining parts of the bean, after the non-aqueous solvent extraction has been completed. Others have suggested removing the oily part of the coffee bean under high pressures in an extrusion press, recovering the volatile flavors from the oil, and adding these ingredients back to a water extract of the press meal or to the concentrated or dried residue from such a water extract. Still other methods have been suggested which rely on the idea that the volatile flavor and aroma ingredients can be removed from the coffee bean prior to extraction with water by flushing the ground bean with steam in a steam distillation process. The steam and volatiles are collected as a condensed distillate. Alternatively the dry, ground coffee, often heated, can be treated with a stream of inert gas to remove volatile materials. The collected volatiles can then be added to the water extract at some more favorable point in the process. Some methods have been employed which use intricate methods of counter-current extraction of the coffee, and some methods emphasize temperature during the extraction and have included elaborate temperature cycles during the extraction steps.

Organoleptic tests (i.e. taste tests) on coffee beverages produced as fresh brews and from both liquid and dry extracts have clearly demonstrated, however, that even with the best known methods of making concentrated extracts, there is a substantial and noticeable difference between fresh brews and beverages made from concentrated extracts of the same blends. While many instant coffees are tasty, desirable beverages, it has not heretofore been possible to retain the fresh brew character in such instant coffees. The reasons for this phenomenon are not entirely known. Numerous suggestions have been made with respect to processing conditions, and especially conditions of extraction, which were thought to preserve the desirable flavor and aroma of the beverage. In many respects these conditions, notably temperature, have been found to be important and correspondingly improvements have been made in instant coffees by careful control of such conditions.

We have discovered a method by which ground, roasted coffee beans can be extracted and the extract concentrated and subsequently dried to produce a dried coffee extract or instant coffee which, when diluted to beverage strength, has a flavor and aroma that, according to experienced coffee tasters, are substantially indistinguishable from those of a fresh brew of the ground roasted coffee beans. In accordance with our invention, we have discovered a novel extraction and drying process which avoids or minimizes deteriorative reactions during the extraction stages, which is effective in extracting not only the desirable flavor and aroma constituents, but also those ingredients which are necessary to preserve the fresh brew characteristics of the extract, which avoids the loss of the valuable flavor and aroma ingredients, and which prevents the deterioration and/or destruction of these ingredients during the extraction and drying stages.

In making our invention, we discovered that the following principles are important to producing a fresh-tasting coffee extract and a corresponding dry product:

(1) Deteriorative reactions affecting the taste of the ultimate product, which have been found to occur in aqueous solution and become more severe in concentrated and hot solutions, must be avoided or inhibited without altering the characteristics of essential components of the extract.

(2) The selective extraction which takes place in the usual countercurrent extraction procedures must be avoided and overcome.

(3) The volatile constituents, including certain fatty acids, which contribute essentially to the acceptability of fresh coffee brew must be recovered unchanged for later addition to a concentrated extract.

(4) The concentration of the extract must be, before drying, as high as is compatible with the economical production of concentrated and dried extracts.

(5) Loss of flavor and aroma constituents must be prevented or minimized during the drying operation.

We have further discovered that, if a dried product having the desirable fresh brew characteristics is to be produced, it is essential to produce a concentrated liquid extract for drying which also has the characteristics of a fresh brew. Accordingly, the invention will be considered first from the standpoint of producing a good extract, that is, one which upon dilution to beverage strength yields a brew having all the characteristics of a fresh brew. Second, the invention will be considered with respect to the drying of such an extract to produce a dried coffee extract product or instant coffee which, when diluted to beverage strength, produces a substantially fresh-tasting brew.

PRODUCTION OF LIQUID EXTRACT

In accordance with one aspect of our invention, a coffee extract having, when diluted to beverage strength, all the characteristics, including flavor and aroma, of a fresh brew can be produced by carrying out the extraction in accordance with the foregoing principles. These principles involve the discovery that certain essential volatile ingredients must be extracted, but the presence of these ingredients in the extract leads to deterioration of the taste and aroma of the ultimate beverage, and that the rate of deterioration increases with increases in concentration of the extract, temperature, and time. Further, it has been found that the flavoring ingredients, including volatile flavors, which are most essential to fresh brew taste are not extracted by cold solutions or by concentrated solutions but are only extracted with hot, dilute solutions.

In carrying out an extraction according to these principles, a number of different procedures may be employed, although these procedures will have certain common features. Essentially, the volatile constituents which lead to the undesirable degradative reactions must be extracted quickly with hot water and in a dilute solution, preferably in the presence of deteriorative or degradative reaction rate reversing agents such as the salts of sulfurous acids, among which is sodium bisulfite.

Alternatively, the essential volatile constituents may be quickly separated from the ground coffee, for example by contacting the coffee with steam. It is important, however, that the steaming operation be carried out not on the unextracted ground coffee but rather on grinds from which the bulk of the solid components has been already extracted. We have, indeed, discovered that steaming of unextracted coffee grinds, as practiced according to prior patents, so alters the morphology of the coffee cells as to render impossible the balanced extraction which is essential for the preparation of extracts tasting like fresh brews.

More specifically, our invention contemplates three methods by which the foregoing principles can be applied to produce an extract which will have, upon proper dilution, the characteristics of a fresh coffee brew.

In the first of these methods the ground roasted coffee can be extracted quickly, at carefully controlled temperatures and carefully controlled solids concentration, while preventing and reversing the deteriorative or degradative reaction by the addition of small amounts of salts of sulfurous acids and alkali metals, one example of which is sodium bisulfite. Ground, roasted coffee can be extracted with dilute extract, at a temperature of between about 180° and 210° F., the dilute extract being the one obtained as the second percolate from a previous batch of coffee as described below. The dilute extract can have added to it one of the salts of sulfurous acid, such as sodium bisulfite, in amounts of 0.05% to about 0.25% of the extract and preferably about 0.097 to 0.1%. The first extract from this initial contact of ground, roasted coffee can be obtained in the shortest possible time to obtain a dilute solution having about 3 to 8% solids by weight and preferably 4 to 6% solids. Additional water at a temperature of between about 180 and 210° F., can be percolated through the grounds to obtain a second percolate which will be used as described above to contact the next batch of coffee. The yield from this procedure can be between about 17% and 25% based on the original weight of the coffee. Generally, the amount of soluble salts of sulfurous acid, such as sodium bisulfite, in the extract should be of the order of 0.75% by weight of the solids present. While a range of amounts of added sodium bisulfite has been specified generally, this range is not determinative of the amounts which might be used. Those skilled in the art will appreciate that the amounts might be adjusted in accordance with economic practices once the use of the reaction rate reversing agents is understood and appreciated. While other equivalent salts might be employed, such as potassium bisulfite, the use of sodium bisulfite is presently preferred.

A second method by which the foregoing principles of extraction can be applied contemplates the extraction, of those parts which are more easily extracted and less essential to fresh flavor, by countercurrent extraction methods with water at a temperature between about 60° F. and about 100° F. and preferably about 70° F., the cold extraction water also containing a degradative or deteriorative reaction preventing agent such as sodium bisulfite in the aforesaid concentrations. The cold extraction is carried out over a period of time sufficient to obtain an extract containing about 25% to about 40% solids and preferably about 30% solids, and a yield of from about 5 to about 18% by weight of the original coffee. Following the cold extraction, a hot dilute extraction is carried out countercurrently and in the presence of degradative or deteriorative reaction preventing agents such as sodium bisulfite. In order to obtain the desired volatile constituents, the hot dilute extraction is carried out at temperatures between about 180° and 210° F., to obtain a solids concentration between about 3% and about 8% and a yield between about 6% and 20%. It should be appreciated that, because of the selective extraction resulting from the differences in temperature of extraction, a hot extraction at some stage in the proceedings is essential if the ultimate product is to have the characteristics of a fresh brew. In other words, the volatile essential ingredients important to the desirable flavor of a fresh brew are those which are less easily extracted and which can only be obtained by a hot dilute extraction, for example with hot water or other extracting mediums such as dilute extract having a temperature in the vicinity of 200° F. The final extract is a combination of the cold concentrated extract and the hot dilute extract in the proper proportions. Or, alternatively, the parts can be kept separate for further treatment prior to reduction to a more concentrated or dry state.

A third method contemplates the application of the foregoing principles in a manner which permits a convenient means of obtaining the essential volatile flavoring materials without undue deterioration and as a separate fraction. A cold, countercurrent extraction is carried out as just previously described including the addition to the extraction water of salts of sulfurous acid such as sodium bisulfite. Following this step, the cold, wet coffee is flushed with steam at reduced or atmospheric pressures, preferably by so regulating the pressure as to obtain temperatures in the bed of coffee of between about 180° and 210° F. so as to obtain a condensed distillate which contains the essential volatile ingredients. After the steaming step, further extraction with water at a temperature of between about 180° and about 210° F. and containing salts of sulfurous acids in the concentration described is carried out, to obtain an extract having between about 3% and about 8% concentration and giving a yield of between about 5% and about 20% of the weight of coffee originally employed. The final extract is made up of proper proportions of the cold, concentrated extract, the condensed steam distillate and the hot, dilute extract, which can be readily determined on the basis of the amount of those ingredients removed from the coffee. Or the parts can be kept separate for further treatment prior to reduction to a more concentrated or dry state.

The following are illustrative examples of the preparation of extracts in accordance with the above described procedures.

Example I

In describing this example, reference should be made to FIGURE 1 which illustrates schematically one illustrative apparatus useful for this process comprising a series of tanks 10, 11 and 12, each of which is equipped with a steam jacket 14, stirrer 15 and screen 18. A water supply line 16 having suitable valving (not shown) leads to each of the vessels and each vessel is provided with a draw-off line 17. In one illustrative procedure 8 lbs. of water having dissolved therein 1.8 grams of sodium bisulfite and having a temperature of 210° F. was placed in vessel 10. 2 lbs. of freshly roasted, ground coffee was added to this vessel while stirring with the agitator 15. After the coffee had been introduced and wetted the stirring was continued for 5 min. and the temperature maintained within the range 180° to 200° F. by means of a steam jacket 14. Upon completion of the time interval, the stirrer was shut off and the extract withdrawn rapidly through the line 17. To assist in the draw-off, pressure is applied to the top of the vessel. Alternatively, a mild vacuum could be applied to the draw-off line.

When all of the extract had been withdrawn, 4 lbs. of hot water was flushed through the coffee grounds and mixed with the first draw-off. The combined first and second draw-off extracts amounted to about 8.8 lbs. of extract having a concentration of 5% solids. The extract represented a yield of 22% based on the amount of the original coffee. The third draw-off was made by introducing 8 lbs. of hot water (about 210° F.) through line 16 and was immediately withdrawn through line 17.

Figure 2:
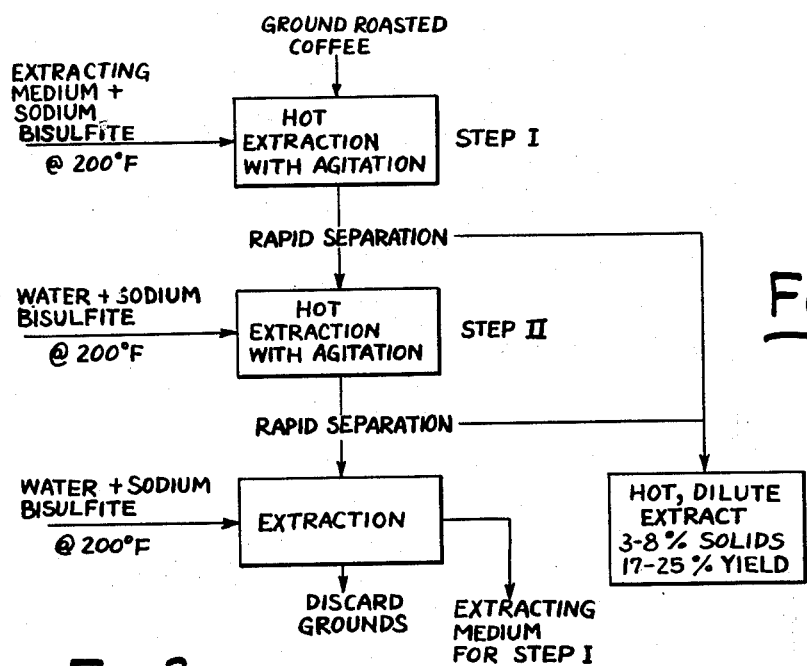
FIG. 2 is a diagrammatic representation of a process according to the invention.

The third draw-off, or extracting medium, was placed in vessel 11 and 1.8 grams of sodium bisulfite was added. The temperature was brought back to 210° F., 2 lbs. of freshly roasted, ground coffee was added and the operation repeated. During subsequent procedures, the previously used vessel was cleaned while the third vessel remained available for a subsequent use. The foregoing steps are illustrated diagrammatically in FIG. 2.

The coffee extract obtained, when diluted to beverage strength, was substantially indistinguishable from the fresh brew of the fresly ground and roasted coffee made in accordance with conventional household procedures.

Example II

Figure 3:
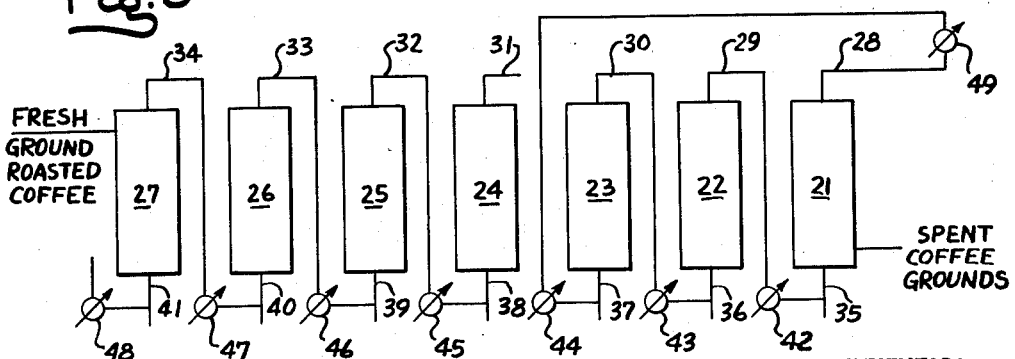
FIG. 3 is a schematic diagram representing a counter-current extraction apparatus.

Referring to FIGURE 3 there is shown a schematic diagram representing a countercurrent extraction apparatus. This apparatus is made up of a series of extractor vessels 21 to 27, inclusive, each having an inlet line 28–34, respectively, and an outlet line 35–41, respectively. Each vessel also has associated therewith a heat exchanger 42–48, respectively. Vessels 21–26 are charged with ground, roasted coffee in various stages of extraction, the coffee in vessel 21 being substantially completely extracted, while the coffee in vessel 26 being relatively fresh. Ground, fresh roasted coffee is charged into the remaining vessel 27. The coffee is preferably a medium-roast good grade coffee, and of the type known in the art to be suitable for use in countercurrent extraction apparatus. Cold water at a temperature of about 70° F. and containing 0.097% by weight sodium bisulfite is introduced, through line 31 into vessel 24. From this vessel the extracting liquid is conducted out through line 38 to an adjacent heat exchanger 45, which maintains the extract at substantially 70° F., and thence into vessel 25. From vessel 25 the extract passes through line 39, heat exchanger 46 into vessel 26, and then through line 40, heat exchanger 47 and into vessel 27 in which the fresh roasted coffee is extracted. Cold, concentrated extract is withdrawn from vessel 27 through line 41 to a concentrated extract storage unit (not shown). The extract from vessel 27 contains about 30% soluble solids and represents a yield of about 18% of the original charge of fresh coffee.

At the same time that the cold extraction is being carried out in vessels 24, 25, 26 and 27, a hot extraction is carried out in vessels 21, 22 and 23 which contain the increasingly extracted coffee grounds from the cold extraction stages. In this section of the operation, vessel 23, having been removed from the cold cycle in the preceding operation, is filled with extracted grounds as well as extract at a temperature of 70° F. Fresh water containing 0.097% sodium bisulfite, along with cold dilute extract from vessel 23 is heated in a heat exchanger 49 to about 220° F. The hot extraction medium is introduced, through line 28, into vessel 21. From vessel 21, the spent coffee grounds are subsequently discharged and discarded. The extract is withdrawn from this vessel through line 35 and, after heating to about 200° F. in a heat exchanger 42, is introduced into vessel 22 through line 29. From vessel 22, the hot extract is withdrawn through line 36 and fed to a heat exchanger 43 in which it is again heated to 200° F. and introduced into vessel 23. Dilute extract is withdrawn from vessel 23 through line 37 and either recycled, if cold, through heat exchanger 49 or withdrawn, if hot, through line 37 and sent to a hot extract storage tank (not shown). The extract, removed from vessel 23 and stored, is at a temperature of at least 150° F., and contains about 4% solids, representing about a 6% yield based on an inital charge of ground roasted coffee.

The combined cold and hot extracts, when mixed for further concentration, have a concentration of about 11.4% solids. This extract has been found, when diluted, to be practically indistinguishable from a fresh brewed coffee made in the conventional household fashion.

The process is then continued, the contents of vessel 21 being removed, and a fresh charge of coffee introduced thereto. The cold water is then introduced into vessel 25 through line 32. The cold extract is removed from vessel 21 through line 35 and conducted to extract storage. The foregoing steps are illustrated diagrammatically in FIG. 4.

*Example III*

The method to be described in this example is a modification of the method described previously in Example II. By this method it is possible to secure even more concentrated extracts of coffee solids and yet obtain the fresh brew flavor which is essential for producing a beverage which is substantially indistinguishable from a fresh brew. FIG. 5 is a schematic representation illustrating this modification of the method described in Example II, and like reference numerals have been used where applicable.

In carrying out this method, after the coffee has been subjected to a first extraction with cold water, the volatiles which are essential for obtaining a fresh brew flavor, are removed as a concentrated steam distillate from a slurry of extract and partially spent coffee grounds remaining after the cold extraction is completed. This is accomplished by introducing steam into the extraction vessel which has just been removed from the cold extraction stage, such as vessel 23, shown in FIG. 3. To this end steam at about 15 p.s.i.g. is introduced into vessel 23 through line 37 and the dilute extract which is driven out of the vessel by the steam is conducted through a line 50 to a storage receptacle 51. When steam begins to issue from the vessel, the vapors are diverted through line 52 to a condenser 53 and the distillate is collected in a condensate storage receptacle 54. In order to give the desired results, the steaming period may vary from between about 3 and about 5 min. after the start of the collection of the steam. When the steam distillate collection is completed, the steam is shut off and the liquor forced out of the vessel 23 by the steam is pumped, along with water containing about 0.097% sodium bisulfite, through a heat exchanger 49 where it is heated to about 200° F. The remaining steps of the procedure are then substantially identical to the steps described in Example II. The extract drawn off of vessel 23 will contain about 4% solids. The combination of the cold extract, the steam distillate, and the hot extract, when diluted to beverage strength, gives a brew not easily distinguishable from a fresh coffee brew. The foregoing steps are illustrated diagrammatically in FIG. 6.

PRODUCTION OF A DRIED PRODUCT FROM A LIQUID EXTRACT

In accordance with another aspect of this invention, that of producing a dried instant coffee product from an extract of the desired characteristics as described above, such an extract must be dried in a manner which results in a granular powdered product which, when dissolved in a sufficient amount of hot water to produce a solution of beverage strength, has the characteristic flavor and aroma of a fresh brew. Accordingly, as a first step, an extract of the above described character must be produced, and then this extract is further concentrated and dried in a unique manner so as to retain the fresh brew characteristics of the product.

Having once obtained the initial extract by one of the methods described above, and such a step is essential to the success of subsequent steps, it must be recognized that the objective of subsequent steps is to obtain all of the essential ingredients as a very concentrated extract, without loss or deterioration, so that this very concentrated extract may be dried with only minor losses of necessary flavoring materials. Certain of the extraction methods described above have been designed to eliminate or reduce some of the concentration steps which are to be described below. Essentially, the method embodying the invention contemplates taking an extract of as high a solids concentration as possible consistent with retaining fresh brew flavor, separating therefrom the volatile materials by a flash evaporation procedure, concentrating the volatile materials by a stripping procedure while taking special care that those volatile materials which are not easily stripped are recovered, centrifuging the flashed extract to remove sediment, concentrating the (non-volatile) solids by evaporation, and combining the concentrated volatiles and the concentrated (non-volatile) solids to form a very concentrated extract which can then be dried with only minor losses of volatile ingredients. The extract of Example I would be subjected in its entirety to the flashing, stripping, concentrating procedures. The cold, concentrated extract of Example II would be concentrated by evaporation only, while the hot dilute extract of Example II would be subjected to the flashing, stripping, concentrated procedures. The cold, concentrated extract and the hot, dilute extract of Example III would be concentrated to the desired level by evaporation only, after which the concentrated extract could be combined with the already concentrated volatiles contained in the condensed steam distillate.

We have found that in extracts which have, when properly diluted, the characteristics of fresh brewed coffee, the volatile flavors, so important to the fine features of a fresh brew, can be effectively removed from the extract by rapidly flashing off under reduced pressure a portion of the extract. After such flashing, the extract remaining can be further concentrated to a very high solids content by evaporation at reduced pressures without danger of deterioration. The volatile material in the condensed fraction from the flashing can be further concentrated without deterioration by a stripping procedure, preferably at reduced pressure.

In order to produce a full, fresh brew flavor in the final product, we have discovered that certain ingredients, found to be of the class of chemicals known as volatile fatty acids, must be present in the extract. These ingredients, we have found, appear in the dilute extracts, but in the process of concentrating the flashed extract and in the process of stripping the volatile principles, they are lost. These ingredients have boiling points very close to that of water, but slightly higher, so that, in an efficient stripping column, they appear in the bottoms or pot material from the stripper and in an efficient evaporator they are lost with the water of evaporation. By either recovering these fatty acids from the pot material of the stripper and the condensate from the evaporator, or by synthesizing an appropriate mixture of fatty acids, and adding this acid mixture to the concentrated coffee extract before drying, it is possible to substantially improve the flavor of the final product.

In adding fatty acids to replace those lost or discarded in the concentration of the extracts, we have found that it is desirable to closely approximate the major naturally occurring acids in the particular coffee blend being processed. Among such acids for the majority of coffee blends are acetic acid, formic acid, isovaleric acid, valeric acid, propionic acid and butyric acid, the first three named of which usually predominate.

The total amount of acids present in coffee and required for our invention is small. Of the total acids, the following approximate range of analytical values for individual acids were obtained in the study of a variety of blends and roasts and will serve as a guide for the practice of the invention:

| Acid in mixture: | Weight percent of total acids |
|---|---|
| Formic acid | 1.5–12.5 |
| Acetic acid | 80–96.5 |
| Isovaleric acid | .5–6.5 |
| Propionic acid | 0–8.5 |
| Butyric acid | 0–2.5 |
| Valeric acid | 0–2 |

Recognizing that the range will vary for different coffee blends, we believe that the foregoing general acid mixture composition will serve as a guide to those skilled in the art in practicing our invention. The use of the foregoing acid mixture in amounts up to about 10 milliliters per 1,000 grams of coffee solids in the extract, has been found to give the desired results. The upper limit is not a fixed one, however, but will depend primarily upon the organoleptic effects of increased amounts of the acids.

While the above description of the use of coffee acids in accordance with our invention is believed to be sufficient to guide those skilled in the art, it may be preferable in specific cases to adjust the acid composition in accordance with the blend and roast employed. This can be done, for example, by performing a gas chromatographic analysis on the extract in question to determine the required acids. Alternatively, the acids can be removed from the extract during concentration by any suitable procedure and added to the concentrated extract before drying.

The end fractions from the concentration procedures on the original extract are therefore: (a) a concentrated stripper overhead containing the volatiles: (b) a combined concentrated volatile fatty acid fraction isolated from the stripper bottoms and from the condensate of the concentration step (or a corresponding synthetic mixture of volatile acids) and: (c) a concentrated non-volatile fraction from the evaporated residue after flashing. These fractions, when mixed together as one very concentrated extract produces, when properly diluted, a beverage with all the features of freshly brewed coffee.

To produce a dried product with only minimal losses of the more volatile ingredients, we have found that the above described unique final concentrated extract must be dried at high solids concentration. More specifically, if the extract has a high concentration of solids, the percent loss of volatiles has been found to become completely acceptable. More specifically, by maintaining the solids concentration in the extract to be dried above 40%, and preferably above 50%, the loss of volatiles is sufficiently small so that the desired volatile content is maintained in the dried product.

For further minimizing the loss of volatiles when drying, the addition to the extracts to be dried of small amounts of certain gums, especially guar gum and locust bean gum, these amounts being on the order of about 0.25% to about 0.50% of the solids present in the extract, is helpful and results in a low acceptable value of percent loss of the volatile components.

Starting with an extract of the character described in Example I above, a portion of such extract, corresponding to approximately 10% to 30% by weight of the initial extract, is rapidly flashed off in a closed system, that is in a system which permits the complete condensation of the vapors flashed out. The condensed flashed material is then stripped in a conventional stripper, whereby the liquid containing the volatiles is conducted countercurrently through a rising current of steam in a packed column and then through a rectifying section. The vapors evolving from the top of the rectifying column are conducted through a condenser and scrubber and are thus recovered as a concentrated fraction containing the desired volatile principles. This fraction of concentrated volatile principles amounts to about 1.0 to 5.0% by weight of the original extract and preferably to about 1.5 to about 3%. Less volatile materials, such as fatty acids, appear in the stripper bottoms and are recovered by treatment in any suitable manner. For example, to recover desired fatty coffee acids, the stripper bottoms are treated with a suitable basic material such as sodium hydroxide to raise the pH of the extract to about 9. The free volatile acids are then recovered in a concentrated state by concentration of the aqueous solution containing the alkaline salts and treatment with a cation exchanger such as an ion exchange resin, an illustrative resin being available commercially under the trademark "Dowex 50." Alternatively, the acids in the stripper bottoms as well as the ones present in the condensate from the concentration of the extract after flashing off, can be determined analytically, for example by performing a gas chromatographic analysis, and a synthetic mixture of such acids added to the final concentrate.

In the flashing and stripping operation, the material flashed off can be conducted without condensation directly into the stripper where the above operations will be performed. The extract remaining from the flashing is centrifuged and then conducted to an evaporator of suitable design, such as a Rodney Hunt Turbofilm evaporator, and concentrated under reduced pressure to a solids concentration of about 60%. The concentrated highly volatile material, the concentrated acids, and the evaporated solids are then combined to form a final extract having solids concentration of about 50%. The final extract can then be dried by any suitable means, such as conventional spray drying, to produce a final dried product which will have, when properly diluted, all the characteristics of a freshly brewed cup of coffee.

We have found that with a high roast product such as an Espresso coffee, the volatile distillate from the flashing operation can be stripped of its volatiles at atmospheric pressure; however especially with lower roasts we prefer to do the stripping under vacuum.

Starting with an extract of the character described in Example II above, a portion of the hot dilute extract corresponding to about 10% to 30% by weight of the original hot dilute extract is flashed off in a closed system. The volatiles and volatile acids are recovered essentially as described above. The cold concentrated extract and the residue from the flashing operation are then combined and concentrated by evaporation as described above. The volatiles, the volatile acids and the concentrated solids are combined to form an extract of about 50% solids by weight and dried by any suitable means to make a final dried product which will have the character of freshly brewed coffee. The volatiles which are present in the cold concentrated extract have been found not to be essential to the development of brewed coffee flavor, thus substantial economies in material handling have been accomplished by this procedure.

Starting with an extract of the character described in Example III above, the cold concentrated extract and the hot dilute extract are combined and evaporated to a solids concentration of about 60%, in the manner described above. The condensed steam distillate and the combined evaporated extract are then mixed and dried in any suitable manner to produce a final dried powder which will have, when properly diluted, the characteristics of freshly brewed coffee.

*Example IV*

Reference should be made to FIG. 7 which illustrates schematically the process described in this example. In a typical application, 19,920 grams of a 5% extract, of the character produced by the process described in Example I above and identified as extract A containing 996 grams of soluble solids and corresponding to a 22% yield from 4,530 grams (10 lbs.) of roasted coffee, was fed while still hot into a falling-film evaporator. A quantity of liquid, corresponding to 20% of the weight of the original extract, was removed by distillation. This operation was conducted under reduced pressure to maintain the temperature of the vapors between about 122° F. and about 140° F. The system, once brought to the desired pressure, was only intermittently connected to the vacuum source. In order to insure that all volatiles were collected, an efficient trap cooled with a Dry Ice and acetone mixture was inserted between the evacuated system and the valves controlling the vacuum pumps. The distillate obtained from the extract, identified as condensate B, amounted to 3,984 grams or 20% of the weight of the original extract. The unvaporized liquor, identified as extract E, amounted to 15,936 grams and had a concentration of 6.24% solids.

The condensate B was then submitted to a stripping operation in order to further concentrate the volatile principles. In this procedure, condensate B was introduced into the stripping system without preheating and the stripping was carried out at a vacuum of about 60 millimeters of mercury. An overhead, identified as C, of 276 grams, corresponding to about 1.38% of the weight of the original extract A, was obtained as a fraction containing all of the organoleptically important volatile components originally present in condensate B except some volatile acids, and the remainder of the condensate B was collected as a pot material D.

Extract E was centrifuged and concentrated by distillation at reduced pressure. The temperature of the extract subjected to concentrating did not exceed 140° F., and this operation yielded a condensate G in the amount of 14,274 grams, and a concentrated extract F in the amount of 1,662 grams, the concentrated extract F having a 60% solids content.

In order to obtain the desired volatile acids J, the condensate G from the extract-concentrating stage, and the pot material B from the stripping stage were combined and the volatile acids separated in a known manner. For example, one illustrative procedure involves bringing the combined mixture to a pH of 9 by the addition of sodium hydroxide. The solution of the sodium salt of the desired acids is then concentrated at reduced pressure to a volume of approximately ⅕ of the volume of the overhead C and is then treated with a quantity of ion exchange resin such as the resin sold under the trademark "Dowex 50," the amount of such ion exchange resin being sufficient to completely transform the metal salts into the corresponding free volatile acids.

In place of collecting the desired volatile acids from the distillates, however, a mixture of the coffee acids can be prepared. To this end, the following mixture of acids was added to the concentrated extract F in the amount of 5.5 milliliters per 1,000 grams of coffee solids in the extract:

| Acid: | Percentage |
|---|---|
| Formic | 9.9 |
| Acetic | 87.4 |
| Isovaleric | 2.2 |
| Valeric | 0.5 |

The combination of the extract F, overhead C and acids J yielded a concentrated extract having a 50% concentration which, on proper dilution with hot or cold water, gave a beverage substantially indistinguishable from a fresh brew of coffee. This concentrated extract, when spray dried, yielded a finely divided soluble powder coffee product which, on appropriate dilution, gave a beverage substantially indistinguishable from a fresh brew of coffee.

*Example V*

To further illustrate the addition of these acids an espresso-type coffee extract, i.e. an extract of a dark roast of a heavy body coffee, was prepared in accordance with the foregoing principles by one of the methods described in Examples I or II, but without recovery of the volatile acids from the bottoms of the stripper or from the condensate of the concentration step. Before drying the concentrated extract, the following acids were added in the amount of 3 milliliters per 1,000 grams of solids:

| Acid: | Percentage |
|---|---|
| Formic | 4.6 |
| Acetic | 86.3 |
| Propionic | 4.6 |
| Butyric | 0.6 |
| Isovaleric | 3.9 |

The coffee extract thus produced, when diluted to beverage strength with hot water, had a flavor and aroma substantially indistinguishable from a fresh brew of the coffee.

It will be appreciated by those skilled in the art that to produce a dried soluble coffee product, starting with fresh, ground, roasted coffee, all of the foregoing steps or their equivalents are essential. While isolated ones of the steps might be used to advantage in other processes, it is by combining all of the steps described above into one process that we are able to produce the desired objectives, namely the production from ground, freshly roasted coffee of a concentrated soluble coffee extract which, upon dilution to beverage strength, is substantially indistinguishable from a fresh brew.

If higher yields are desired, it is possible to prepare our extracts as described above and subsequently submit the "spent" grounds to hydrolytic conditions in the manner known to those skilled in the art. For example, the "spent" grounds can be further extracted with high-pressure saturated steam, followed by hot water, to obtain an additional yield of up to 20–25% of the weight of the original roasted coffee. The resulting "hydrolysate," after clarification and concentration by any known means, can be admixed in the desired proportion to the concentrated "low-yield" extract just prior to drying. The resulting mixture, if a dry soluble coffee is desired, can then be dried in the conventional manner. Also in this case, it is of course desirable that the extract to be dried have a concentration of about 40% or higher, in order to prevent excessive loss of desirable volatile components. It is to be noted that, during the concentration step, the undesirable volatile components of the hydrolysate are eliminated, all to the advantage of the quality of the final product.

To illustrate the use of hydrolysate in connection with our invention, the product prepared as in Example IV can be made at higher yields by including desired portions of so-called hydrolysate from the spent grounds. For instance, a solution obtained by extraction of the spent grounds with high temperature water can be concentrated by evaporation and added to the concentrated solids, concentrated aroma fraction and the concentrated acids to make a final concentrated product for drying. Or the hydrolysate can be concentrated and dried and the dried product blended with the dried product of the above prepared extracts. Or the extract from high temperature extraction can be added to the flashed, centrifuged solids residue and concentrated together with it.

For example, the grounds after the extraction process described are subjected to treatment with steam at 100 p.s.i.g. for 10 minutes and the vessel containing the steamed grounds filled with water at 100 p.s.i.g. and 320° F. temperature. Three such portions of grounds are treated and filled in essentially a countercurrent fashion. From the third such portion of grounds in its vessel two pounds of extract are withdrawn. This extract will have a concentration of about 15% and a yield of about 15%. This extract is concentrated to 30% solids by vacuum evaporation in a suitable evaporator such as a Rodney Hunt Turbofilm evaporator. The concentrated extract is then added to the flashed, centrifuged extract (extract E) and the combined extract evaporated to 60% solids in a suitable apparatus. The concentrated extract is then combined with the concentrated volatile fraction and the concentrated volatile fatty acid fraction and the process completed as described above. The yield of product from the original coffee is thus increased to 38%. Any yield desired may be obtained by this procedure.

Higher yields may be obtained by increasing the amount of draw-off. Higher solids concentration may be obtained by countercurrently extracting several such vessels. The additional yield can be concentrated by evaporation by any suitable means as for instance by vacuum evaporation to any concentration desired.

We claim as our invention:

1. The method of producing an extract of ground roasted coffee which extract, on dilution to beverage strength, has a taste and an aroma substantially indistinguishable from that of a fresh brew of said coffee, comprising the steps of:
   (1) extracting freshly roasted and ground coffee with hot water to obtain an original hot dilute extract having between about 3% and about 8% concentration of coffee solids, said water being at a temperature between about 180 and about 210° F.,
   (2) separating volatile coffee principles from said extract by flashing,
   (3) centrifuging and concentrating said extract,
   (4) concentrating said volatile coffee principles by stripping under a pressure condition between vacuum and atmospheric, and collecting the overhead as concentrated volatile principles, and
   (5) mixing said concentrated coffee extract with said concentrated volatile principles.

2. The method of producing an extract of coffee as defined in claim 1 wherein said mixture of concentrated coffee extract and concentrated volatile principles has a solids concentration of at least about 40%.

3. The method of producing an extract of coffee as defined in claim 19 wherein said sulfurous acid salt is sodium bisulfite.

4. The method of producing an extract of ground roasted coffee which extract, on dilution to beverage strength, has a taste and aroma substantially indistinguishable from that of a fresh brew of such coffee, comprising the steps of extracting freshly roasted and ground coffee with cold water to produce a cold concentrated extract of coffee solids, said water being at a temperature between about 60° F. and about 100° F., extracting said ground coffee with hot water to produce a hot dilute extract of coffee solids including volatile coffee principles, said water being at a temperature between about 180° and about 210° F., separating said volatile principles from said hot dilute extract to produce a volatile distillate, concentrating said volatile principles by stripping said principles from said volatile distillate under a pressure condition between vacuum and atmospheric, concentrating said cold extract and said separated hot extract and producing a combined concentrated extract, and mixing said concentrated volatile principles with said combined concentrated extract.

5. The method of producing an extract of ground roasted coffee which extract, on dilution to beverage strength, has a taste and an aroma substantially indistinguishable from that of a fresh brew of such coffee, comprising the steps of extracting freshly roasted and ground coffee with cold water to produce a cold concentrated extract of coffee solids, said water being at a temperature between about 60° F. and about 100° F., extracting said ground coffee with hot water to produce a hot dilute extract of coffee solids including volatile coffee principles, said water being at a temperature between about 180° and about 210° F., separating said volatile principles from said hot dilute extract to produce a volatile distillate, concentrating said volatile principles by stripping said principles from said volatile distillate under a pressure condition between vacuum and atmospheric, concentrating said cold extract and said separated hot extract and producing a combined concentrated extract, mixing said concentrated volatile principles with said combined concentrated extract, and adding to said mixture a mixture of volatile coffee acids to an amount organoleptically corresponding substantially to the amount of the volatile acids present in the original extract.

6. The method of producing an extract of ground roasted coffee which extract, on dilution to beverage strength, has a taste and an aroma substantially indistinguishable from that of a fresh brew of such coffee, comprising the steps of extracting freshly roasted and ground coffee with cold water to produce a cold concentrated extract of coffee solids, said water being at a temperature between about 60° F. and about 100° F., extracting said ground coffee with hot water to produce a hot dilute extract of coffee solids including volatile coffee principles, said water being at a temperature between about 180° and about 210° F., separating said volatile principles from said hot dilute extract to produce a volatile distillate, concentrating said volatile principles by stripping said principles from said volatile distillate under a pressure condition between vacuum and atmospheric, concentrating said cold extract and said separated hot extract and producing a combined concentrated extract, mixing said concentrated volatile principles with said combined concentrated extract, and adding to said mixture a mixture of volatile coffee acids selected from the group consisting of acetic acid, formic acid, isovaleric acid, valeric acid, propionic acid, and butyric acid to an amount organoleptically corresponding substantially to the amount of the volatile acids present in the original extract, to obtain a final mixture of concentrated extract, volatile principles and coffee acids having a solid content of at least about 40% solids.

7. The method of producing an extract of ground roasted coffee which extract, on dilution to beverage strength, has a taste and an aroma substantially indistinguishable from that of a fresh brew of such coffee, comprising the steps of extracting freshly roasted and ground coffee with cold water to produce a cold concentrated extract of coffee solids, said water being at a temperature between about 60° and about 100° F., extracting said ground coffee with hot water to produce a hot dilute extract of coffee solids including volatile coffee principles, said water being at a temperature between about 180° and about 210° F., separating said volatile principles from said hot dilute extract to produce a volatile distillate, concentrating said volatile principles by stripping said principles from said volatile distillate under a pressure condition between vacuum and atmospheric, concentrating said cold extract and said separated hot extract and producing a combined concentrated extract, mixing said concentrated volatile principles with said combined concentrated extract to obtain a final mixture of concentrated extract and volatile principles having a solid content of at least about 40% solids and drying said final mixture to obtain a powdered soluble coffee extract, which upon dilution to beverage strength has a taste and aroma substantially indistinguishable from that of a fresh brew of coffee.

8. The method of producing an extract of ground roasted coffee which extract, on dilution to beverage strength, has a taste and an aroma substantially indistinguishable from that of a fresh brew of such coffee, comprising the steps of extracting freshly roasted and ground coffee with cold water to produce a cold concentrated extract of coffee solids, said water being at a temperature between about 60° and about 100° F., extracting said ground coffee with hot water to produce a hot dilute extract of coffee solids including volatile coffee principles, said water being at a temperature between about 180° and about 210° F., separating said volatile principles from said dilute extract to produce a volatile distillate, concentrating said volatile principles by stripping said principles from said volatile distillate under a pressure condition between vacuum and atmospheric, concentrating said cold extract and said separated hot extract and producing a combined concentrated extract, mixing said concentrated volatile principles with said combined concentrated extracts, adding to said mixture a mixture of volatile coffee acids selected from the group consisting of acetic acid, formic acid, isovaleric acid, valeric acid, propionic acid, and butyric acid to an amount organoleptically corresponding substantially to the amount of the volatile acids present in the original extract, to obtain a final mixture of concentrated extract, volatile principles and coffee acids having a solid content of at least about 40% solids, dispersing a small amount of a vegetable gum into said extract, and drying said extract to obtain a powdered soluble coffee extract, which upon dilution to beverage strength has a taste and aroma substantially indistinguishable from that of a fresh brew of coffee.

9. The method of producing an extract of ground roasted coffee which extract, on dilution to beverage strength, has a taste and an aroma substantially indistinguishable from that of a fresh brew of such coffee, comprising the steps of extracting freshly roasted and ground coffee with cold water to produce a cold concentrated extract of coffee solids, said water being at a temperature between about 60° and about 100° F., extracting said ground coffee with hot water to produce a hot dilute extract of coffee solids including volatile coffee principles, said water being at a temperature between about 180° and about 210° F., said extraction water including a small amount of an alkali metal salt of sulfurous acid dissolved therein, separating said volatile principles from said hot dilute extract to produce a volatile distillate, concentrating said volatile principles by stripping said principles from said volatile distillate under a pressure condition between vacuum and atmospheric, and concentrating said cold extract and said separated hot extract and producing a combined concentrated extract having a solid content of at least about 40% solids.

10. The method of producing a coffee extract as defined in claim 9 wherein said alkali metal salt of sulfurous acid is sodium bisulfite.

11. The method of producing an extract of ground roasted coffee which extract, on dilution to beverage strength, has a taste and an aroma substantially indistinguishable from that of a fresh brew of such coffee, comprising the steps of extracting freshly roasted and ground coffee with cold water said water being at a temperature between about 60° F. and about 100° F., to produce a cold concentrated extract of coffee solids, extracting said ground coffee with hot water to produce a hot dilute extract of coffee solids including volatile coffee principles said water being at a temperature between about 180° and about 210° F., said extraction water including a small amount of an alkali metal salt of sulfurous acid dissolved therein, separating said volatile principles from said hot dilute extract to produce a volatile distillate, concentrating said volatile principles by stripping said principles from said volatile distillate under a pressure condition between vacuum and atmospheric, concentrating said cold extract and said separated hot extract and producing a combined concentrated extract, mixing said concentrated volatile principles with said combined concentrated extract, adding to said mixture a mixture of volatile coffee acids selected from the group of acids consisting of acetic acid, formic acid, isovaleric acid, valeric acid, propionic acid, and butyric acid, to obtain a final mixture of concentrated extract, to an amount organoleptically corresponding substantially to the amount of the volatile acids present in the original extract, volatile principles, and coffee acids having a solid content of at least about 40% solids, dispersing a small amount of a vegetable gum into said extract, and drying said extract to obtain a powdered soluble coffee extract, which upon dilution to beverage strength has a taste and aroma substantially indistinguishable from that of a fresh brew of coffee.

12. The method of producing an extract of ground roasted coffee which extract, on dilution to beverage strength, has a taste and an aroma substantially indistinguishable from that of a fresh brew of such coffee, comprising the steps of extracting freshly roasted and ground coffee with water having a temperature of between about 60° F. and about 100° F., to produce a cold concentrated extract of coffee solids having a concentration of between about 25% and about 40% solids, extracting said ground coffee with water at a temperature of between about 180° F. and 210° F. to produce a hot dilute extract of coffee solids including volatile coffee principles, and having a concentration of between about 3% and about 8% solids, separating said volatile principles from said hot dilute extract by flash evaporation to produce a volatile distillate, concentrating said volatile principles by stripping said principles from said distillate at a pressure condition between vacuum and atmospheric, concentrating said cold extract and said separated hot extract, and producing a combined concentrated extract having a concentration of about 60% solids, and mixing said combined concentrated extract with said concentrated volatile principles.

13. The method of producing an extract of ground roasted coffee which extract, on dilution to beverage strength, had a taste and an aroma substantially indistinguishable from that of a fresh brew of such coffee, comprising the steps of extracting freshly roasted and ground coffee with water at a temperature of between about 60° F. and about 100° F., to produce a cold concentrated extract of coffee solids having a concentration of between about 25% and about 40% solids, extracting said ground coffee with hot water at a temperature between about 180° F. and 210° F. to produce a hot dilute extract of coffee solids including volatile coffee principles and having a concentration of between about 3% and about 8% solids, said extraction water including a salt of sulfurous acid and an alkali metal dissolved therein in an amount corresponding to about 0.75% of the total extracted solids, separating said volatile principles from said hot dilute extract by flash evaporation to produce a volatile distillate, concentrating said volatile principles by stripping said principles from said distillate at a pressure condition between vacuum and atmospheric, concentrating said cold extract and said separated hot extract, to produce a combined concentrated extract having a concentration of about 60% solids, mixing said combined concentrated extract with said concentrated volatile principles, and adding to said combined concentrated extract and said volatile principles a mixture of volatile coffee acids selected from the group consisting of acetic acid, formic acid, valeric acid, isovaleric acid, propionic acid and butyric acid, said mixture of acids being in an amount of about 2 to about 10 milliliters per 1000 grams of solids, and organoleptically corresponding substantially to the amount of the volatile acids present in the original cold and hot extracts, to obtain a concentrated extract mixture having a solid content of at least about 40%.

14. The method of producing an extract of coffee as defined in claim 13 wherein said sulfurous acid salt is sodium bisulfite.

15. The method of producing an extract of ground roasted coffee which extract, on dilution to beverage strength, has a taste and an aroma substantially indistinguishable from that of a fresh brew of such coffee, comprising the steps of extracting freshly roasted and ground coffee with water at a temperature of between about 60° F. and about 100° F., to produce a cold concentrated extract of coffee solids having a concentration of between about 25% and about 40% solids, extracting said ground coffee with hot water at a temperature between about 180° F. and 210° F. to produce a hot dilute extract of coffee solids including volatile coffee principles and having a concentration of between about 3% and about 8% solids, said extraction water including an alkali metal salt of sulfurous acid dissolved therein in an amount corresponding to about 0.75% of the total extracted solids, separating said volatile principles from said hot dilute extract, by flash evaporation to produce a volatile distillate, concentrating said volatile principles by stripping said principles from said volatile distillate at a pressure condition between vacuum and atmospheric, concentrating said cold extract and said separated hot extract to produce a combined concentrated extract having a concentration of about 60% solids, mixing said combined concentrated extract with said concentrated volatile principles, adding to said combined concentrated extract and said volatile principles mixture a mixture of volatile coffee acids comprising about 80% to about 96.5% acetic acid, about 1.5% to about 12.5% formic acid, up to about 2% valeric acid, about 0.5% to about 6.5% isovaleric acid, up to about 8.5% propionic acid and up to about 2.5% butyric acid, said mixture of acids being in an amount of about 2 to about 10 milliliters per 1000 grams of solids and organoleptically corresponding substantially to the amount of the volatile acids present in the original cold and hot extracts, to obtain a concentrated extract mixture having a solids content of at least about 40%, dispersing into said concentrated extract mixture a vegetable gum in an amount of between about 0.25% and about 0.50% by weight of coffee solids in said extract, and drying said extract mixture to obtain a powdered soluble coffee extract which upon dilution to beverage strength has a taste and aroma substantially indistinguishable from that of a fresh brew of coffee.

16. The method of producing an extract of ground roasted coffee which extract, on dilution to beverage strength, has a taste and an aroma substantially indistinguishable from that of a fresh brew of such coffee, comprising the steps of extracting fresh roasted ground coffee with cold water to produce a cold concentrated extract, said water being at a temperature between about 60° and about 100° F., removing essential volatile coffee principles from said ground coffee by contacting said coffee with a current of steam, condensing the volatile rich steam emerging from the ground coffee to produce a distillate containing volatile coffee principles, extracting said ground coffee with hot water to produce a hot dilute extract of coffee solids, said water being at a temperature between about 180° and about 210° F., concentrating said cold extract and said hot extract to produce a combined concentrated extract, and mixing the resulting concentrated extract with said distillate.

17. The method of producing an extract of coffee as defined in claim 2 including the step of drying said concentrated extract mixture to obtain a powdered soluble coffee extract which upon dilution to beverage strength has a taste and aroma substantially indistinguishable from that of a fresh brew of coffee.

18. The method of producing an extract of coffee as defined in claim 17 including the step of dispersing a small amount of vegetable gum into said concentrated extract.

19. The method of producing an extract of coffee as defined in claim 1 wherein said hot water has dissolved therein in a small amount of alkali metal salt of sulfurous acid.

20. The method of producing an extract of coffee as defined in claim 1, including the step of mixing said concentrated coffee extract and said concentrated volatile principles with a mixture of volatile coffee acids selected from the group consisting of acetic acid, formic acid, valeric acid, isovaleric acid, propionic acid and butyric acid, in an amount organoleptically corresponding substantially to the amount of volatile acids present in the original combined cold and hot extracts.

21. The method of producing an extract of coffee as defined in claim 1 wherein said original hot diluted extract contains between about 3% and about 8% solids, wherein said volatile coffee principles are separated from said extract by flashing off between about 10% and about 30% by weight of said extract, wherein said centrifuging and concentrating said extract by evaporation provides a concentration of about 60% solids and wherein said concentrating said volatile coffee principles by stripping under a pressure condition between vacuum and atmospheric is conducted to produce an amount of concentrated volatile principles equal to between about 1% and 5% by weight of said original extract.

22. The method of producing an extract of coffee as defined in claim 16 wherein said cold concentrated extract has a concentration of between about 25% and 40% solids, wherein said contacting of said coffee with a current of steam is effected at about 15 p.s.i.g. for a period between about 3 and 5 minutes, wherein said extraction of said ground coffee with hot water produces a hot dilute extract of coffee solids having a concentration between about 3% and 8% solids, and wherein said concentrating of said cold extract and said hot extracts produces a combined concentrated extract having a concentration of about 60% solids.

23. The method of producing an extract of coffee as defined in claim 1 including the additional steps of hydrolyzing the previously extracted roasted and ground coffee with high-pressure saturated steam, and further extracting the hydrolyzed grounds with water to recover an additional extract.

References Cited in the file of this patent

UNITED STATES PATENTS

| | | |
|---|---|---|
| 2,077,564 | Heuser | Apr. 20, 1937 |
| 2,380,046 | Huguenin | July 10, 1945 |
| 2,457,315 | Milleville | Dec. 28, 1948 |
| 2,513,813 | Milleville | July 4, 1950 |
| 2,573,406 | Clough et al. | Oct. 30, 1951 |
| 2,641,550 | Dykstra | June 9, 1953 |
| 2,687,355 | Benner | Aug. 24, 1954 |

FOREIGN PATENTS

| | | |
|---|---|---|
| 260,960 | Great Britain | Feb. 22, 1928 |